US009914882B2

(12) United States Patent
Little et al.

(10) Patent No.: US 9,914,882 B2
(45) Date of Patent: Mar. 13, 2018

(54) REVERSE EMULSION BREAKER POLYMERS

(71) Applicant: Ecolab USA Inc., St. Paul, MN (US)

(72) Inventors: Virgil T. Little, Rosenberg, TX (US); Izabela A. Owsik, College Station, TX (US)

(73) Assignee: Ecolab USA Inc., St. Paul, MN (US)

( * ) Notice: Subject to any disclaimer, the term of this patent is extended or adjusted under 35 U.S.C. 154(b) by 25 days.

(21) Appl. No.: 15/058,113

(22) Filed: Mar. 1, 2016

(65) Prior Publication Data

US 2016/0257891 A1 Sep. 8, 2016

Related U.S. Application Data

(60) Provisional application No. 62/129,197, filed on Mar. 6, 2015.

(51) Int. Cl.
| | | |
|---|---|---|
| *C10G 33/04* | (2006.01) | |
| *C08F 6/14* | (2006.01) | |
| *B01D 17/04* | (2006.01) | |
| *C08G 18/08* | (2006.01) | |

(52) U.S. Cl.
CPC .......... *C10G 33/04* (2013.01); *B01D 17/047* (2013.01); *C08F 6/14* (2013.01); *C08G 18/0814* (2013.01)

(58) Field of Classification Search
CPC .. C10G 33/04; B01D 17/047; C08G 18/0814; C08F 6/14
See application file for complete search history.

(56) References Cited

U.S. PATENT DOCUMENTS

| | | | | |
|---|---|---|---|---|
| 2,130,947 | A | * 9/1938 | Carothers | ............... C07C 55/14 |
| | | | | 528/335 |
| 2,407,895 | A | 9/1946 | Monson et al. | |
| 3,594,393 | A | 7/1971 | Buriks et al. | |
| 3,734,889 | A | 5/1973 | Lipowski et al. | |
| 3,993,615 | A | * 11/1976 | Markofsky | .......... B01D 17/047 |
| | | | | 524/770 |
| 4,038,296 | A | 7/1977 | Greif et al. | |

(Continued)

FOREIGN PATENT DOCUMENTS

| | | |
|---|---|---|
| CN | 103788289 A | 5/2014 |
| EP | 0 377 313 A2 | 7/1990 |

(Continued)

OTHER PUBLICATIONS

Nguyen, D., et al., "Effect of Diluents and Asphaltenes on Interfacial Properties and Steam-Assisted Gravity Drainage Emulsion Stability: Interfacial Rheology and Wettability," Energy & Fuels, 2014, pp. 1641-1651, vol. 25.

(Continued)

*Primary Examiner* — Michael A Salvitti
(74) *Attorney, Agent, or Firm* — Senniger Powers LLP

(57) ABSTRACT

The present invention generally relates to methods for resolving water and oil emulsions in the produced fluid of an oil production system comprising adding a reverse emulsion breaker to the produced fluid of the crude oil production system in an amount effective for resolving an oil-in-water emulsion. In particular, these methods for resolving an oil-in-water emulsion can be used in separation processes where the oil and solids in the produced fluid are separated from the produced water in the produced fluid.

20 Claims, 1 Drawing Sheet

(56) References Cited

U.S. PATENT DOCUMENTS

| | | | |
|---|---|---|---|
| 4,098,692 A | | 7/1978 | Baker et al. |
| 4,179,396 A | | 12/1979 | Gabel et al. |
| 4,183,821 A | | 1/1980 | Langdon et al. |
| 4,202,957 A | | 5/1980 | Bonk et al. |
| 4,238,330 A | * | 12/1980 | Fong .................. B01D 17/0205 |
| | | | 210/708 |
| 4,247,476 A | * | 1/1981 | Haase .................... A01N 37/30 |
| | | | 210/729 |
| 4,303,780 A | * | 12/1981 | Bellos .................. B01D 17/047 |
| | | | 210/705 |
| 4,440,902 A | | 4/1984 | Diery et al. |
| 4,448,708 A | | 5/1984 | Killat et al. |
| 4,500,735 A | | 2/1985 | Diery et al. |
| 4,505,839 A | * | 3/1985 | Bellos .................. B01D 17/047 |
| | | | 516/174 |
| 4,731,481 A | | 3/1988 | Bellos et al. |
| 4,741,835 A | | 5/1988 | Jacques et al. |
| 4,762,899 A | | 8/1988 | Shikinami |
| 4,981,936 A | | 1/1991 | Good, Jr. et al. |
| 5,032,285 A | * | 7/1991 | Braden ...................... C02F 1/54 |
| | | | 210/708 |
| 5,153,259 A | | 10/1992 | Padget et al. |
| 5,371,131 A | | 12/1994 | Gierenz et al. |
| 5,643,460 A | * | 7/1997 | Marble ................ B01D 17/047 |
| | | | 166/267 |
| 5,873,911 A | * | 2/1999 | Danner .................. C08G 71/02 |
| | | | 252/8.86 |
| 5,921,912 A | * | 7/1999 | Hart ...................... B01D 17/047 |
| | | | 210/708 |
| 5,936,045 A | | 8/1999 | Warzelhan et al. |
| 6,399,735 B1 | | 6/2002 | Fischer et al. |
| 6,787,628 B2 | | 9/2004 | Thetford et al. |
| 7,041,707 B2 | | 5/2006 | Hahn |
| 7,645,725 B2 | | 1/2010 | Weaver et al. |
| 7,994,112 B2 | | 8/2011 | Vanpachtenbeke et al. |
| 8,129,326 B2 | | 3/2012 | Misske et al. |
| 8,530,597 B2 | | 9/2013 | Kurian et al. |
| 8,802,740 B2 | | 8/2014 | Newman et al. |
| 9,260,545 B1 | * | 2/2016 | Squicciarini .............. C08F 2/32 |
| 2004/0147407 A1 | | 7/2004 | Hahn |
| 2004/0176537 A1 | | 9/2004 | Armentrout et al. |
| 2006/0237372 A1 | * | 10/2006 | Arciszewski ...... B01D 17/0217 |
| | | | 210/708 |
| 2008/0318812 A1 | * | 12/2008 | Kakadjian, Sr. ........ C09K 8/035 |
| | | | 507/221 |
| 2009/0306232 A1 | * | 12/2009 | Williams ............... C10G 33/04 |
| | | | 516/140 |
| 2010/0234631 A1 | | 9/2010 | Misske et al. |
| 2011/0147306 A1 | | 6/2011 | Polizzotti et al. |
| 2011/0253598 A1 | | 10/2011 | McDaniel et al. |
| 2011/0253599 A1 | | 10/2011 | Cross et al. |
| 2012/0130037 A1 | | 5/2012 | Querci et al. |
| 2012/0171301 A1 | | 7/2012 | Koenig et al. |
| 2013/0072405 A1 | | 3/2013 | Favero et al. |
| 2015/0096750 A1 | * | 4/2015 | Loiseau ................... C09K 8/36 |
| | | | 166/280.2 |
| 2015/0307788 A1 | * | 10/2015 | McDaniel .............. C10G 33/04 |
| | | | 524/105 |
| 2015/0361350 A1 | * | 12/2015 | Prasad ................. G05D 7/0676 |
| | | | 700/285 |
| 2016/0257891 A1 | * | 9/2016 | Little ..................... C10G 33/04 |
| 2016/0257892 A1 | * | 9/2016 | Owsik .................. B01D 17/047 |
| 2016/0311940 A1 | * | 10/2016 | Hund ........................ C08F 8/00 |
| 2016/0369170 A1 | * | 12/2016 | Balsamo De | 
| | | | Hernandez ............. C10G 33/04 |
| 2017/0066881 A1 | * | 3/2017 | Rose .................... C08G 73/024 |

FOREIGN PATENT DOCUMENTS

| | | |
|---|---|---|
| EP | 0429892 A2 | 6/1991 |
| EP | 0 824 156 A1 | 8/1997 |
| WO | 02/38645 A1 | 5/2002 |
| WO | 2004/067594 A2 | 8/2004 |
| WO | WO 2008031781 A2 * | 3/2008 ......... C08G 73/0293 |

OTHER PUBLICATIONS

Schmalz et al. "Morphology, Surface Structure, and Elastic Properties of PBT-Based Copolyesters with PEO-b-PEB-b-PEO triblock Copolymer Soft Segments", Macromolecules 2002, 35, 5491-5499 (published on the web—Jun. 6, 2002).

Kuwamura et al., Surface active block copolymers: I. The preparation and some surface active properties of block copolymers of tetrahydrofuran and ethylene oxide, Journal of the American Oil Chemists' Society, vol. 48, Issue 1, Jan. 1971, pp. 29-34.

Becker J.R., Crude Oil Waxes, Emulsions, and Asphaltenes. Tulsa, Oklahoma: Penn Well Publishing Company, ISBN 0-87814-737-3, Dec. 31, 1997, pp. 3, 84-85, Fig. 5-1.

International Search Report dated Jun. 8, 2016 in related PCT Application No. PCT/US2016/020439, 3 pages.

Written Opinion dated Jun. 8, 2016 in related PCT Application No. PCT/US2016/020439, 6 pages.

International Search Report and Written Opinion dated Jun. 14, 2016 in related PCT Application No. PCT/US2016/020248, 11 pages.

* cited by examiner

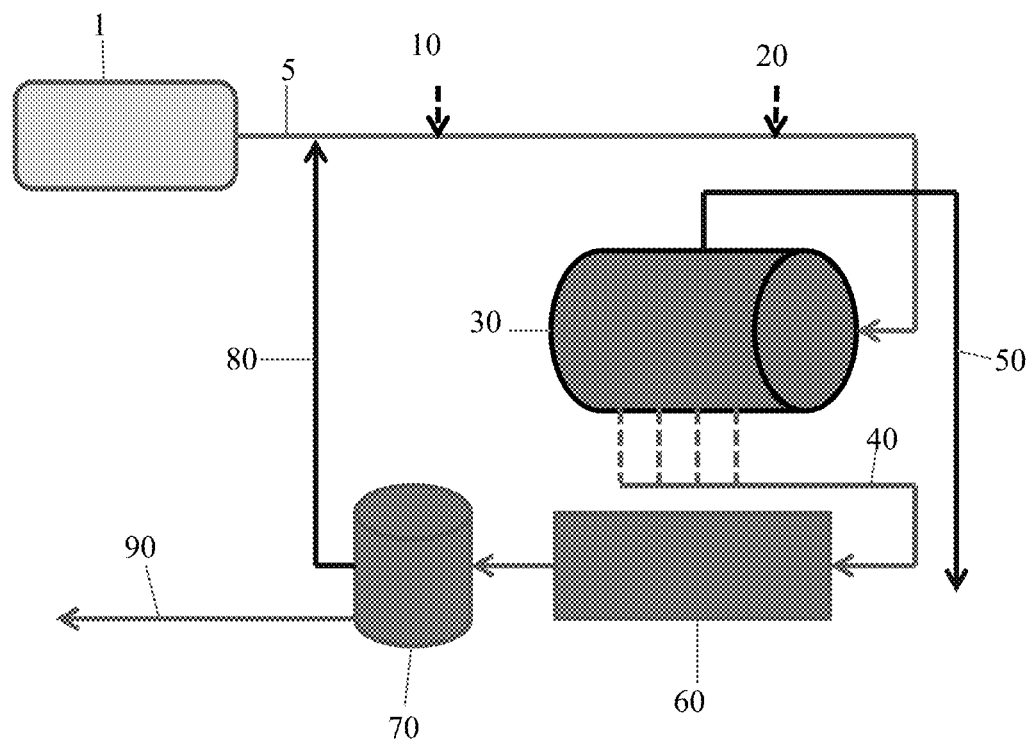

REVERSE EMULSION BREAKER POLYMERS

CROSS-REFERENCE TO RELATED APPLICATION

This application claims priority to U.S. Provisional Patent Application Ser. No. 62/129,197 filed on Mar. 6, 2015, the disclosure of which is incorporated herein by reference in its entirety.

FIELD OF THE INVENTION

The present invention generally relates to methods for resolving water and oil emulsions in the produced fluids of an oil production system comprising adding a reverse emulsion breaker to the produced fluid of the crude oil production system in an amount effective for resolving an oil-in-water emulsion. In particular, these methods for resolving an oil-in-water emulsion can be used in separation processes where the oil and solids in the produced fluid are separated from the produced water in the produced fluid.

BACKGROUND OF THE INVENTION

Oil-in-water and water-in-oil-in-water emulsions can occur in many industrial systems. For example, these emulsions are a problem in many energy extraction systems because the produced fluids contain oil and solids dispersed in the produced water and separation of the oil and solids from the water is needed to comply with the oil sales specifications and to provide acceptable specifications before the water can be disposed of or re-used.

In particular, oil-in-water and water-in-oil-in-water emulsions can be problems in produced fluid (steam assisted gravity drainage (SAGD), steam flood, etc.) separation processes where the oil and solids in the produced fluid are separated from the produced water in the produced fluid.

For example, SAGD operations inject steam into geological formations to stimulate the production of bitumen or heavy hydrocarbon. Oil sands deposits in Alberta, Canada represent an area where this process is extensively used. Pairs of horizontal wells are bored into the oil-containing formation. The upper well injects steam and the lower well which is positioned below the steam injection line, continuously extracts a complex emulsion. That emulsion contains bitumen and water. The emulsion is broken; the bitumen is sent for upgrading/refining, while the produced water (separated from the emulsion) is treated and reused as feedwater for the steam generators.

SUMMARY OF THE INVENTION

One aspect of the invention is a method of resolving a reverse emulsion in produced fluid of an oil production system comprising adding a reverse emulsion breaker to the produced fluid of the crude oil production system in an amount effective for resolving the reverse emulsion, wherein the reverse emulsion breaker is a polyquaternary ammonium salt. The polyquaternary ammonium salt comprises the reaction product of contacting a polyamine intermediate with either a difunctional alkylating agent or a crosslinking agent. The polyamine intermediate comprises a reaction product of contacting (i) a diamine, a triamine, a tetramine, or a combination thereof with (ii) urea, a dicarboxylic acid, an acid anhydride, a dialkyl ester of a carboxylic acid, or a combination thereof.

Other objects and features will be in part apparent and in part pointed out hereinafter.

BRIEF DESCRIPTION OF THE DRAWINGS

FIG. 1 is a schematic of a separation system to separate solids, oil, and water in an emulsified hydrocarbon fluid.

Corresponding reference characters indicate corresponding parts throughout the drawings.

DESCRIPTION OF THE PREFERRED EMBODIMENTS

The present invention is directed to methods for the improved separation of water and oil in oil production and processing operations. The method of the present invention comprises treating a system containing oil and water, where emulsions form, with a polyquaternary ammonium salt solution. The polyquaternary ammonium salt containing treatments of the present invention were found to be effective treatments for resolving (breaking or inhibiting) oil-in-water (reverse) and water-in-oil-in-water emulsions in petroleum processes. Particularly, these reverse emulsion breakers are effective for improving the water quality in steam-assisted gravity drainage (SAGD) processes. The reverse emulsion breakers disclosed herein are also typically water-soluble.

One aspect of the invention is a method of resolving a reverse emulsion in produced fluid of an oil production system comprising adding a reverse emulsion breaker to a produced fluid of the oil production system in an amount effective for resolving the reverse emulsion, the reverse emulsion breaker comprising a polyquaternary ammonium salt.

Another aspect of the invention is a reverse emulsion breaker comprising a polyquaternary ammonium salt.

Yet another aspect of the invention is a reverse emulsion breaker comprising a reaction product of a polymerization mixture comprising polyquaternary ammonium salt.

Further, the reverse emulsion breaker described herein can be used in a method of resolving a reverse emulsion in produced fluids of an oil production system comprising adding the reverse emulsion breaker to the produced emulsion of the oil production system in an amount effective for resolving the reverse emulsion.

The reverse emulsion can be an oil-in-water emulsion, a water-in-oil-in-water emulsion, or a combination thereof. Particularly, the reverse emulsion can be a water-in-oil-in-water emulsion.

For the reverse emulsion breaker described herein, the reverse emulsion breaker is a polyquaternary ammonium salt; the polyquaternary ammonium salt being the reaction product of contacting a polyamine intermediate with either a difunctional alkylating agent or a crosslinking agent; the polyamine intermediate being a reaction product of contacting (i) a diamine, a triamine, a tetramine, or a combination thereof, with (ii) urea, a dicarboxylic acid, an acid anhydride, a dialkyl ester of a carboxylic acid, or a combination thereof.

The diamine, triamine, or tetramine can be dimethylaminopropylamine, dimethylaminomethylamine, dimethylaminoethylamine, dimethylaminobutylamine, dimethylaminopentylamine, dimethylaminohexylamine, dimethylaminoheptylamine, dimethylaminooctylamine, dimethylaminononylamine, dimethylaminodecylamine, methylethylaminolauryl amine, methyl bis(3-aminopropyl) amine, methyl bis(3-aminoethyl)amine, N-(2-aminoethyl)

piperazine, dimethyltriethylenetetramine, diethylaminopropylamine, aminodiethylaminostearyl alcohol, N'-bis (propylaminoethyl)butylenediamine, bis(aminopropyl) propanediamine, aminotripropylamine, dimethylaminoallylamine, diethanolaminododecylamine, diethylenetriamine, triethylenetetramine, bis(hexamethylene)triamine, or a combination thereof.

The diamine can comprise dimethylaminopropylamine, dimethylaminomethylamine, dimethylaminoethylamine, dimethylaminobutylamine, dimethylaminopentylamine, or a combination thereof. Preferably, the diamine can comprise dimethylaminopropylamine.

The dicarboxylic acid can be a linear $C_2$-$C_{36}$ dicarboxylic acid, an anhydride thereof, a dialkyl ester thereof, or a combination thereof.

The dicarboxylic acid can be oxalic acid, malonic acid, succinic acid, glutaric acid, adipic acid, pimelic acid, suberic acid, azelaic acid, sebacic acid, fumaric acid, itaconic acid, citraconic acid, undecanedioic acid, dodecanedioic acid, phthalic acid, isophthalic acid, terephthalic acid, maleic acid, glutaconic acid, traumatic acid, muconic acid, brassic acid, brassylic acid, roccellic acid, tartaric acid, diphenic acid, or a combination thereof.

The acid anhydride can be malonic anhydride, succinic anhydride, glutaric anhydride, adipic anhydride, pimelic anhydride, suberic anhydride, azelaic anhydride, sebacic anhydride, fumaric anhydride, itaconic anhydride, citraconic anhydride, undecanedioic anhydride, dodecanedioic anhydride, phthalic anhydride, maleic anhydride, brassic anhydride, brassylic anhydride, roccellic anhydride, or a combination thereof.

The dialkyl ester of a carboxylic acid can be dimethyl malonate, diethyl malonate, dimethyl succinate, diethyl succinate, dimethyl glutarate, diethyl glutarate, dimethyl adipate, diethyl adipate, dimethyl pimelate, diethyl pimelate, dimethyl suberate, diethyl suberate, dimethyl azelate, diethyl azelate, dimethyl sebacate, diethyl sebacate, dimethyl fumarate, diethyl fumarate, dimethyl itaconate, diethyl itaconate, dimethyl citraconate, diethyl citraconate, dimethyl undecanedioate, diethyl undecanedioate, dimethyl dodecanedioate, diethyl dodecanedioate, dimethyl phthalate, diethyl phthalate, dimethyl maleate, diethyl maleate, dimethyl brassate, diethyl brassate, dimethyl brassylate, diethyl brassylate, dimethyl roccellate, diethyl roccellate, or a combination thereof.

The dialkyl ester of a carboxylic acid can be dimethyl succinate, diethyl succinate, dimethyl malonate, diethyl malonate, dimethyl glutarate, diethyl glutarate, a dibasic ester thereof, or a combination thereof.

The polyamine intermediate can comprise a reaction product of contacting a diamine, a triamine, a tetramine, or a combination thereof with urea. The polyamine intermediate can comprise a reaction product of dimethylaminopropylamine, dimethylaminomethylamine, dimethylaminoethylamine, dimethylaminobutylamine, dimethylaminopentylamine, or a combination thereof (preferably, dimethylaminopropylamine) with urea.

The polyamine intermediate can comprise a reaction product of contacting a diamine, a triamine, a tetramine, or a combination thereof with succinic anhydride. The polyamine intermediate can comprise a reaction product of dimethylaminopropylamine, dimethylaminomethylamine, dimethylaminoethylamine, dimethylaminobutylamine, dimethylaminopentylamine, or a combination thereof (preferably, dimethylaminopropylamine) with succinic anhydride.

The polyamine intermediate can comprise a reaction product of contacting a diamine, a triamine, a tetramine, or a combination thereof with dimethyl malonate, diethyl malonate, malonic acid, or a combination thereof. The polyamine intermediate can comprise a reaction product of dimethylaminopropylamine, dimethylaminomethylamine, dimethylaminoethylamine, dimethylaminobutylamine, dimethylaminopentylamine, or a combination thereof (preferably, dimethylaminopropylamine) with dimethyl malonate, diethyl malonate, malonic acid, or a combination thereof.

The polyamine intermediate can comprise a reaction product of contacting diethylenetriamine, dipropylenetriamine, or bis(6-aminohexamethylene) amine with urea.

The polyquaternary ammonium salt can comprise a reaction product of the polyamine intermediate with a difunctional alkylating agent. The difunctional alkylating agent can be 1,3-dichloropropan-2-ol, bis(2-chloroethyl)ether, triglycoldichloride, difluoroisobutylether, dibromomethylether, diiododecylpolyether, dichlorononylpolyether, difluorotetrabutyldecylpolyether, epichlorohydrin-functionalized polyethylene glycol, epichlorohydrin-functionalized polypropylene glycol, epichlorohydrin-functionalized poly(ethylene oxide-co-propylene oxide), bisphenol A diglycidyl ether, or a combination thereof.

The difunctional alkylating agent can comprise bis(2-chloroethyl)ether, 1,3-dichloropropan-2-ol, or a combination thereof. The difunctional alkylating agent can comprise 1,3-dichloropropan-2-ol. The difunctional alkylating agent can comprise bis(2-chloroethyl)ether.

The difunctional alkylating agent can comprise epichlorohydrin-functionalized polyethylene glycol, epichlorohydrin-functionalized polypropylene glycol, epichlorohydrin-functionalized poly(ethylene oxide-co-propylene oxide), or a combination thereof.

The polyquaternary ammonium salt can comprise a reaction product of the polyamine intermediate with a crosslinking agent. The crosslinking agent can be a reaction product of epichlorohydrin and trimethylolpropane, glycerin, sorbitol, pentaerithritol, polypropylene glycol, polyethylene glycol, or a combination thereof.

The crosslinking agent can comprise a reaction product of epichlorohydrin and trimethylolpropane. Further, the crosslinking agent can comprise a reaction product of epichlorohydrin and glycerin.

The crosslinking of the polyquaternary amine can be achieved by reacting a polyamine intermediate, diamine, triamine or tetramine with a difunctinal alkylating agent or a crosslinking agent followed by reaction with difunctional alkylating agent, or a combination thereof.

The crosslinking agent can also be used to react with terminal chloromethylene groups of polyquaternary ammonium salts.

The crosslinking agent can be diethylenetriamine, polyethyleneimine, triethylenetetramine, tetraethylenepentamine, or a combination of thereof.

The reverse emulsion can be a water-in-oil-in-water emulsion.

The number average molecular weight of the polyquaternary ammonium salt can be from about 200 Daltons to about 200,000 Daltons, from about 200 Daltons to about 100,000 Daltons, from about 200 Daltons to about 80,000 Daltons, from about 200 Daltons to about 60,000 Daltons, from about 200 Daltons to about 40,000 Daltons, from about 1,000 Daltons to about 200,000 Daltons, from about 1,000 Daltons to about 100,000 Daltons, from about 1,000 Daltons to about 80,000 Daltons, from about 1,000 Daltons to about 60,000 Daltons, from about 1,000 Daltons to about 40,000 Daltons.

Preferably, the number average molecular weight of the polyquaternary ammonium salt can be from about 2,000 to about 20,000 Daltons.

The reverse emulsion breakers are typically water-soluble.

The produced water of the oil production system can be produced water from a steam-assisted gravity drainage production system or a cyclic steam stimulation system.

The produced water can be from a steam-assisted gravity drainage production system.

The effective amount of the reverse emulsion breaker can be from about 2 ppm to about 200 ppm, from about 2 ppm to about 180 ppm, from about 2 ppm to about 160 ppm, from about 2 ppm to about 150 ppm, from about 2 ppm to about 120 ppm, from about 2 ppm to about 100 ppm, from about 10 ppm to about 200 ppm, from about 10 ppm to about 180 ppm, from about 10 ppm to about 160 ppm, from about 10 ppm to about 150 ppm, from about 10 ppm to about 120 ppm, from about 10 ppm to about 100 ppm based on the total volume of the produced fluid.

Preferably, the effective amount of the reverse emulsion breaker can be from about 20 ppm to about 75 ppm based on the total volume of the produced fluid.

The reverse emulsion breaker can be combined with an emulsion breaker to the produced fluid of the oil production system.

The emulsion breaker can comprise an oxyalkylated phenol-formaldehyde resin, a resin ester, an oxyalkylated polyalkylamine, a polyol, a cross-linked polyol with a di- or multi-functional cross-linker, an isocyanate, an acid, or a combination thereof. Preferably, the emulsion breaker can comprise a polyol and resin blend.

Preferably, the reverse emulsion breaker is water-soluble.

When the reverse emulsion breaker is used to break an emulsion in an oil production system, the emulsion can be in the produced fluid from a steam-assisted gravity drainage production system or a cyclic steam stimulation system.

Further, when the reverse emulsion breaker is used to break an emulsion in an oil production system, the produced fluid is from a steam-assisted gravity drainage production system.

In some instances, the emulsion breaker and the reverse emulsion breaker have a synergistic effect for resolving the water-in-oil-in-water emulsion in the produced water of an oil production system.

The emulsion breaker can have a concentration from about 1 ppm to about 2,000 ppm, from about 1 ppm to about 1,000 ppm, from about 1 ppm to about 750 ppm, from about 1 ppm to about 500 ppm, from about 10 ppm to about 2,000 ppm, from about 10 ppm to about 1,000 ppm, from about 10 ppm to about 750 ppm, from about 10 ppm to about 500 ppm, from about 50 ppm to about 2,000 ppm, from about 50 ppm to about 1,000 ppm, from about 50 ppm to about 750 ppm, from about 50 ppm to about 500 ppm, from about 100 ppm to about 2,000 ppm, from about 100 ppm to about 1,000 ppm, from about 100 ppm to about 750 ppm, or from about 100 ppm to about 500 ppm.

The reverse emulsion breaker can be used in combination with a flocculant.

A diluent can be added to the production system and the diluent can be condensate, naphtha, kerosene, light crude oil, or a combination thereof.

The polyquaternary ammonium salts of the present invention can be prepared by polycondensation of polyamine intermediate(s) with difunctional alkylating agent or with the crosslinker/difunctional alkylating agent mixture or with the crosslinker followed by polycondensation with difunctinal alkylating agent.

The reverse emulsion breaker can be dissolved in a solvent. The solvent can be water, methanol, ethylene glycol, or organic polar solvent.

The reverse emulsion breaker of the composition can further comprise a coagulant or a flocculant.

The coagulant can be a cationic polymer with a molecular weight ranging from about 500 Da to about 1,000,000 Da, from about 500 Da to about 500,000 Da, from about 500 Da to about 300,000 Da, from about 500 Da to about 100,000 Da, from about 3000 Da to about 1,000,000 Da, from about 3000 Da to about 500,000 Da, from about 3000 Da to about 300,000 Da, from about 3000 Da to about 100,000 Da, from about 10,000 Da to about 1,000,000 Da, from about 10,000 Da to about 500,000 Da, from about 10,000 Da to about 300,000 Da, from about 30,000 Da to about 1,000,000 Da, from about 30,000 Da to about 500,000 Da, or from about 30,000 Da to about 300,000 Da.

The flocculants can be a cationic polymer with a molecular weight ranging from about 200,000 Da to about 15,000,000 Da, from about 500,000 Da to about 15,000,000 Da, from about 1,000,000 Da to about 15,000,000 Da, from about 5,000,000 Da to about 15,000,000 Da, from about 10,000,000 Da to about 15,000,000 Da, from about 200,000 Da to about 12,000,000 Da, from about 500,000 Da to about 12,000,000 Da, from about 1,000,000 Da to about 12,000,000 Da, from about 5,000,000 Da to about 12,000,000 Da, or from about 10,000,000 Da to about 12,000,000 Da.

The reverse emulsion breakers of the present invention are preferably added to the inlet emulsion to a water and oil separating system. The water and oil separating system is depicted in FIG. 1 and comprises a production well 1 that produced a produced fluid carried in a produced fluid line 5. To the produced fluid line 5 can be added an emulsion breaker, a reverse emulsion breaker, or a combination thereof at injection point 10. When the reverse emulsion breaker is combined with the optional emulsion breaker, they can be injected independently, simultaneously, or sequentially. Further, a diluent can be injected at injection point 20. The produced fluid is then sent to one or more separation vessels 30. The separation vessels can be a free water knock out (FWKO) vessel, a heat treater, or a phase separator. The produced water from the separation vessel(s) is carried in a produced water line 40 to a flotation tank 60. The produced water from the flotation tank 60 is sent to a skim tank 70 where the bottoms are sent to a produced water tank through the produced water tank line 90 and recycled oil is skimmed from the surface of the liquid in the skim tank 70 and sent back to the produced fluid line 5 through the recycled oil line 80. The tops from the separation vessels are sent to the oil tank through the oil line 50.

The efficacy of the reverse emulsion breaker polyquaternary ammonium salt is dependent upon a number of factors such as water drop, water quality, interface quality, oil dryness, and the like.

Emulsion stability is monitored by measuring phase separation at about 90° C. to about 150° C. using conventional bottle testing. The produced emulsion (100 mL) is poured in a 6 ounce prescription glass bottle and heated for approximately 30 to 60 minutes at about 90° C. to about 150° C. in a water bath. A diluent is added to the emulsion and mixed using a mechanical shaker at low speed for five minutes or mixed by shaking the bottle by hand. In some tests the mixed emulsion is placed back in the water bath at about 90° C. to about 150° C.; in other cases the next step is injection. The reverse emulsion breaker (REB), and optionally emulsion breaker (EB) and are injected at a designated dose, hand-shaken for 100 cycles (or in a shaker at low setting for 1 minute), and placed in the water bath at 90° C. for observation of water drop during 60-120 minutes. Basic sediments and water (BS&W) are determined by diluting 6 mL of the oil close to the interface with 6 mL xylene, toluene, or mineral spirits (e.g., Varsol™) and centrifuging for five minutes. Water clarity was ranked on a comparative visual scale from 11 (partially broken reverse) to a 1 (≤50 NTU). A rating of 9 could be deemed equivalent to 1500 NTU, while a rating of 4 or 5 would be equal to about 500 NTU.

Having described the invention in detail, it will be apparent that modifications and variations are possible without departing from the scope of the invention defined in the appended claims.

EXAMPLES

The following non-limiting examples are provided to further illustrate the present invention.

Example 1: Synthesis of Crosslinkers Based on Glycerol

Glycerol (50.15 grams) and 0.4 mL of boron trifluoride diethyl etherate (47% $BF_3$ basis) were placed in a flask equipped with a stirrer, a thermometer, a condenser, and an addition tube. This solution was heated to 60° C. Then, 453.16 grams of epichlorohydrin was added dropwise. The epichlorohydrin was added over a period of two hours; the temperature was kept between 60 to 70° C. and controlled by external cooling. After the exothermic reaction was over, the temperature was raised to 65° C. and an additional 0.2 mL of boron trifluoride diethyl etherate was added. The reaction was continued for additional 2 to 3 hours to insure complete reaction.

Example 2: Synthesis of a Polyamine Intermediate 1

N,N-dimethylaminopropylamine (306.2 grams) was placed in a 500 mL kettle reactor equipped with a condenser, an overhead stirrer, a thermocouple, an outlet to an aqueous hydrochloric acid bath (to neutralize ammonia released during reaction), and a nitrogen inlet. The amine was heated to 150° C. When the temperature was stabilized, 90.1 grams of urea was added portionwise (addition time from 30 minutes to 1 hour) with monitoring of the ammonia release rate. When the urea addition was finalized, the reaction mixture was kept at 160° C. for 16 hours. Then, the product was transferred to a bottle and analyzed.

Example 3: Synthesis of a Polyquaternary Ammonium Salt

The polyamine intermediate prepared in Example 2 (100.6 g) was placed in the flask equipped with a stirrer, a thermometer, a condenser, and an addition tube. The temperature was raised to 115° C. Then, 4.1 grams of the crosslinker prepared in Example 1 was weighed and added to polyamine intermediate. The reaction mixture was stirred at 115° C. for 3 hours. Then, 41 grams of water was added followed by dropwise addition of 61.0 grams of bis(2-chloroethyl)ether. When the addition was finalized, an additional 30 grams of water was added and the reaction mixture was held at 115° C. until the chloride content was about 9.5% and the quaternary amines content was higher than 95%. Then, the reaction mixture was transferred to a bottle and analyzed.

Example 4: Synthesis of Crosslinked Polyquaternary Ammonium Salt

The polyquaternary ammonium salt from Example 3 (100 grams) was placed in the flask and heated to 115° C. followed by addition of 1 gram of diethylenetriamine (E-100, PEI). The reaction mixture was kept at 115° C. for 3 hours and then transferred to a bottle and analyzed.

Example 5: Synthesis of Polyamine Intermediate

Diethylenetriamine (355.35 g) was placed in 1 L kettle reactor equipped with a condenser, an overhead stirrer, a thermocouple, an outlet to an aqueous hydrochloric acid bath (to neutralize ammonia released during reaction), and a nitrogen inlet. The amine was heated to 150° C. When the temperature was stabilized, 207.20 grams of urea was added portionwise (addition time from 30 minutes to 1 hour) with monitoring of ammonia release rate. When the urea addition was finalized, the reaction mixture was left to react at 160° C. for 16 hours. Then, the product was transferred to a bottle and analyzed.

Example 6: Synthesis of Product 1

Polyamine intermediate prepared according to Example 2 (100 grams) and 45.0 grams of water were placed in the flask equipped with a stirrer, a thermometer, a condenser, and an addition tube. The temperature was raised to 200° F. Then, 56.0 g of 1,3-dichloroisopropanol was added portionwise (addition time: 30-40 minutes). The reaction mixture was stirred at 115° C. for 2 to 3 hours. Then, 30.0 grams of water and 0.3-0.5 mL of 2-ethylhexanol were added and the reaction was kept at 115° C. for 16-20 hours. The reaction was finalized by addition of 82 grams of water. The product was then transferred to a bottle and analyzed.

Example 7: Synthesis of Product 3

Dimethylaminopropylamine (204.36 g) was placed in a flask equipped with an overhead stirrer, a thermocouple, a condenser, and a Dean-Stark trap. Diethyl malonate (160.17 grams or 132.15 grams of dimethyl malonate or 104.06 grams of malonic acid) and 1.65 grams of para-toluenosulfonic acid, monohydrate were added and the reaction mixture was heated to 240° F. (115° C.) until no by-product (ethanol in case of diethyl malonate, methanol in case of dimethyl malonate and water in case of malonic acid) was collected in the Dean-Stark trap and the tertiary amine content was greater than 98%. The intermediate wasn't purified or separated. The Dean-Stark trap was disconnected. Water (80.7 grams) was added and the mixture was heated to 104° C. (220° F.). Then, 143.01 grams of bis(2-chloroethyl)ether was added dropwise using an addition funnel. The addition rate was adjusted to control the exotherm generated during reaction. The reaction temperature was kept between 100-113° C. (212-235° F.). When the addition was finalized the reaction mixture was kept at 113° C. (235° F.) for 3 hours. Then, 121.01 grams of D.I. water was added and the reaction mixture was heated at 113° (235° F.) for 16 hours. The process was finalized when the quaternary ammonium salt content was higher than 90.00%.

To stop the reaction and dilute the product, 201.7 grams of D.I. water was added. The final product was transferred to a bottle and analyzed.

Product 2 was synthesized using the procedure above, except succinic anhydride was substituted for the diethyl malonate and 1,3-dichloroisopropanol was substituted for bis(2-chloroethyl)ether.

Example 8: Synthesis of Crosslinker

Poly(ethylene glycol) (300.15 grams) was placed in the flask equipped with a stirrer, a thermometer, a condenser, and an addition funnel. Boron trifluoride diethyl etherate (0.75 mL, 47% based on $BF_3$, Aldrich) was added and mixture was heated to 60° C. Then, 138.85 grams of epichlororhydrin was added dropwise over 1 hour. After the addition of epichlorohydrin was finalized, the temperature was raised to 75° C. and reaction mixture was kept at that temperature for 4 hours. The product was transferred to a storage container and used for further reaction.

Example 9: Synthesis of Crosslinked Polyquaternary Amine

Product from Example 8 (57.36 grams), 30.68 grams of polyamine intermediate as prepared in Example 2 and 20.22 grams of water were placed in the flask equipped with a stirrer, a thermometer, a condenser, and an addition tube. The temperature was raised to 115° C. and the reaction mixture was kept at this temperature for 4 to 10 hours. Then, 8.43 grams of 1,3-dichloroisopropanol was added portionwise to the reaction mixture (addition time of 30-40 minutes). The reaction mixture was stirred at 115° C. for 2-3 hours. Then, 29.0 grams of water and about 0.3-0.5 mL of 2-ethylhexanol were added. The reaction was kept at 115° C. for 16-20 hours. Then, the reaction was kept at 115° C. for 16-20 hours. The reaction was finalized by addition of 45.67 grams of water. The product was then transferred to a bottle and analyzed.

Example 10: Test Results

Emulsion stability was monitored by measuring phase separation at about 90° C. using conventional bottle testing. The produced emulsion (100 mL) was poured in a 6 ounce prescription glass bottle and heated for approximately 30 to 60 minutes at about 90° C. in a water bath. A diluent (e.g., an aromatic solvent) was added to the emulsion and mixed using a mechanical shaker at low speed for five minutes or mixed by shaking the bottle by hand. In some tests the mixed emulsion was placed back in the water bath at 90° C. and in other cases the next step was injection of the reverse emulsion breaker and optionally, the emulsion breaker into the emulsion. The flow sheet of the production plant that is being mimicked determines whether the emulsion was placed back into the water bath or if the reverse emulsion breaker, and optionally, the emulsion breaker were injected into the emulsion.

An emulsion breaker (EB) and a reverse emulsion breaker (REB) were injected by syringe at a designated dose, shook by hand for 100 cycles, and placed in the water bath at 90° C. for observation during 60-120 minutes. Basic sediments (BS=emulsion content in thief) and water (W=water content in thief) were measured by diluting 6 mL of the oil close to the interface with 6 mL xylene, toluene, or mineral spirits (e.g., Varsol™) and centrifuging for five minutes and BS+W is the sum of those measurements. Water clarity (WQ) was ranked on a comparative visual scale from 11 (partially broken reverse) to a 1 (≤50 NTU). A rating of 9 could be deemed equivalent to 1500 NTU, while a rating of 4 or 5 would be equal to about 500 NTU. Water drop (WD) was measured at 5, 15, and 30 minutes.

EB A, EB B, REB 1, REB 2, and REB 3 are incumbent products. The composition of Products 1-3 are detailed below.

| Canada SAGD location 1: EB A (polyol/resin blend) at 380 ppm | | | | | | | |
|---|---|---|---|---|---|---|---|
| REB | Conc. (ppm) | WD (5 min.) | WD (15 min.) | WD (30 min.) | WQ | W | BS | W + BS |
| REB 1 (polyamine quat) | 75 | 74 | 80 | 84 | 11 | 0.0 | 6.0 | 6.0 |
| Product 1 | 75 | 80 | 84 | 87 | 10 | 0 | 3.2 | 3.2 |
| Product 2 | 75 | 80 | 84 | 87 | 10 | 1.2 | 2 | 3.2 |
| Product 3 | 75 | 80 | 80 | 82 | 7 | 1.2 | 1.2 | 2.4 |
| REB 1 (polyamine quat) | 100 | 60 | 68 | 80 | 6 | 0.4 | 4.8 | 5.2 |
| Product 1 | 100 | 84 | 84 | 85 | 4 | 0 | 2.6 | 2.6 |
| Product 2 | 100 | 84 | 84 | 88 | 5 | 1.2 | 1.6 | 2.8 |
| Product 3 | 100 | 82 | 83 | 86 | 4 | 1.2 | 1.6 | 2.8 |
| REB 1 (polyamine quat) | 125 | 80 | 80 | 82 | 5 | 0.4 | 3.4 | 3.8 |
| Product 1 | 125 | 84 | 87 | 88 | 3 | 0 | 2.4 | 2.4 |
| Product 2 | 125 | 86 | 86 | 89 | 4 | 1.2 | 0.8 | 2 |
| Product 3 | 125 | 85 | 86 | 89 | 3 | 0.8 | 1.6 | 2.4 |
| REB 1 (polyamine quat) | 150 | 76 | 80 | 82 | 4 | 1.2 | 3.4 | 4.6 |
| Product 1 | 150 | 86 | 86 | 89 | 3 | 0 | 2 | 2 |
| Product 2 | 150 | 84 | 86 | 87 | 3 | 1.2 | 0.8 | 2 |
| Product 3 | 150 | 86 | 87 | 88 | 3 | 1 | 1.8 | 2.8 |

| Canada SAGD location 2: EB B (oxyalkylated polyol blend) at 300 ppm | | | | | |
|---|---|---|---|---|---|
| REB | Conc. (ppm) | WD (2 min.) | WD (30 min.) | WQ (2 min.) | WQ (30 min.) |
| REB 2 (polyamine quat) | 25 | 65 | 70 | 6 | 5 |
| REB 3 (polyamine quat) | 25 | 60 | 68 | 8 | 7 |
| Product 3 | 25 | 68 | 70 | 6 | 5 |
| REB 2 (polyamine quat) | 30 | 69 | 73 | 6 | 5 |
| REB 3 (polyamine quat) | 30 | 60 | 70 | 8 | 8 |
| Product 3 | 30 | 69 | 73 | 5 | 5 |
| REB 2 (polyamine quat) | 35 | 65 | 68 | 7 | 6 |
| REB 3 (polyamine quat) | 35 | 70 | 70 | 5 | 5 |
| Product 3 | 35 | 70 | 71 | 5 | 5 |
| REB 2 (polyamine quat) | 40 | 70 | 73 | 5 | 4 |
| REB 3 (polyamine quat) | 40 | 70 | 72 | 6 | 6 |
| Product 3 | 40 | 72 | 73 | 5 | 5 |

| Components | | mass in reaction mix, g | Composition (%) |
|---|---|---|---|
| Product 1 | N,N'-Bis[3-(dimethylamino)propyl]urea | 101.03 | 32.2 |
| Product 1 | 1,3-dichloroisopropanol | 55.93 | 17.8 |
| Product 1 | water | 157 | 50 |
| Int 2 | N,N-dimethylpropylamine (DMAPA) | 185.13 | |
| Int 2 | Succinic Anhydride | 90.66 | |
| Int 2 | p-TSA monohydrate | 1.99 | |
| Product 2 | Int 2: (N,N'-Bis[3-(dimethylamino)propyl]-succinamide) | 261.5 | 34.7 |
| Product 2 | 1,3-dichloropropan-2-ol | 115.3 | 15.3 |
| Product 2 | Water | 376 | 50 |
| Int 3 | N,N-dimethylpropylamine (DMAPA) | 75.76 | |
| Int 3 | Diethyl malonate | 59.36 | |
| Product 3 | Int 3: (N,N'-Bis[3-(dimethylamino)propyl]-malonamide) | 101 | 32.2 |
| Product 3 | Bis(2-chloroethyl ether) | 55.9 | 17.8 |
| Product 3 | water | 157 | 50 |

When introducing elements of the present invention or the preferred embodiments thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and methods without departing from the scope of the invention, it is intended that all matter contained in the above description and shown in the accompanying drawings shall be interpreted as illustrative and not in a limiting sense.

What is claimed is:

1. A method of breaking a reverse emulsion in produced fluid of an oil production system comprising:
   adding a reverse emulsion breaker to the produced fluid of the oil production system in an amount effective for breaking the reverse emulsion
   wherein the reverse emulsion breaker is a polyquaternary ammonium salt;
   the polyquaternary ammonium salt being the reaction product of contacting a polyamine intermediate with either a difunctional alkylating agent or a crosslinking agent;
   the polyamine intermediate being a reaction product of contacting (i) a diamine, a triamine, a tetramine, or a combination thereof with (ii) urea, a dicarboxylic acid, an acid anhydride, a dialkyl ester of a carboxylic acid, or a combination thereof.

2. The method of claim 1 wherein the diamine, triamine, or tetramine is dimethylaminopropylamine, dimethylaminomethylamine, dimethylaminoethylamine, dimethylaminobutylamine, dimethylaminopentylamine, dimethylaminohexylamine, dimethylaminoheptylamine, dimethylaminooctylamine, dimethylaminononylamine, dimethylaminodecylamine, methylethylaminolauryl amine, methyl bis(3-aminopropyl)amine, methyl bis(3-aminoethyl)amine, N-(2-aminoethyl)piperazine, dimethyltriethylenetetramine, diethylaminopropylamine, aminodiethylaminostearyl alcohol, N'-bis(propylaminoethyl)butylenediamine, bis(aminopropyl)propanediamine, aminotripropylamine, dimethylaminoallylamine, diethanolaminododecylamine, diethylenetriamine, triethylenetetramine, bis(hexamethylene)triamine, or a combination thereof.

3. The method of claim 2 wherein the diamine comprises dimethylaminopropylamine.

4. The method of claim 1, wherein the dicarboxylic acid is a linear $C_2$-$C_{36}$ dicarboxylic acid, an anhydride thereof, or a combination thereof.

5. The method of claim 4, wherein the dicarboxylic acid is oxalic acid, malonic acid, succinic acid, glutaric acid, adipic acid, pimelic acid, suberic acid, azelaic acid, sebacic acid, fumaric acid, itaconic acid, citraconic acid, undecanedioic acid, dodecanedioic acid, phthalic acid, isophthalic acid, terephthalic acid, maleic acid, glutaconic acid, traumatic acid, muconic acid, brassic acid, brassylic acid, roccellic acid, tartaric acid, diphenic acid, or a combination thereof.

6. The method of claim 1, wherein the acid anhydride is malonic anhydride, succinic anhydride, glutaric anhydride, adipic anhydride, pimelic anhydride, suberic anhydride, azelaic anhydride, sebacic anhydride, fumaric anhydride, itaconic anhydride, citraconic anhydride, undecanedioic anhydride, dodecanedioic anhydride, phthalic anhydride, maleic anhydride, brassic anhydride, brassylic anhydride, roccellic anhydride, or a combination thereof.

7. The method of claim 1, wherein the dialkyl ester of a carboxylic acid is dimethyl malonate, diethyl malonate, dimethyl succinate, diethyl succinate, dimethyl glutarate, diethyl glutarate, dimethyl adipate, diethyl adipate, dimethyl pimelate, diethyl pimelate, dimethyl suberate, diethyl suberate, dimethyl azelate, diethyl azelate, dimethyl sebacate, diethyl sebacate, dimethyl fumarate, diethyl fumarate, dimethyl itaconate, diethyl itaconate, dimethyl citraconate, diethyl citraconate, dimethyl undecanedioate, diethyl undecanedioate, dimethyl dodecanedioate, diethyl dodecanedioate, dimethyl phthalate, diethyl phthalate, dimethyl maleate, diethyl maleate, dimethyl brassate, diethyl brassate, dimethyl brassylate, diethyl brassylate, dimethyl roccellate, diethyl roccellate, or a combination thereof.

8. The method of claim 7, wherein the dialkyl ester of a carboxylic acid is dimethyl succinate, diethyl succinate, dimethyl malonate, diethyl malonate, dimethyl glutarate, diethyl glutarate, a dibasic ester thereof, or a combination thereof.

9. The method of claim 2, wherein the polyamine intermediate comprises a reaction product of contacting a diamine, a triamine, a tetramine, or a combination thereof with urea.

10. The method of claim 2, wherein the polyamine intermediate comprises a reaction product of contacting a diamine, a triamine, a tetramine, or a combination thereof with succinic anhydride.

11. The method of claim 2, wherein the polyamine intermediate comprises a reaction product of contacting a diamine, a triamine, a tetramine, or a combination thereof with dimethyl malonate, diethyl malonate, malonic acid, or a combination thereof.

12. The method of claim 1, wherein the crosslinking agent comprises a reaction product of glycerin or trimethylolpropane and polyepichlorohydrin.

13. The method of claim 1, wherein the crosslinking agent is used to react with terminal chloromethylene groups of the polyquaternary salt and the crosslinking agent is diethylenetriamine, polyethyleneimine, triethylenetetramine, tetraethylenepentamine or a combination of thereof.

14. The method of claim 1, wherein the molecular weight of the polyquaternary ammonium salt is from about 2,000 to about 20,000 Daltons.

15. The method of claim 1, wherein the reverse emulsion breaker is water-soluble.

16. The method of claim 1, wherein the produced water of the oil production system is produced water from a steam-assisted gravity drainage production system or a cyclic steam stimulation system.

17. The method of claim 1, wherein the effective amount of the reverse emulsion breaker is from about 2 ppm to about 200 ppm based on the total volume of the produced fluid.

18. A method of breaking a reverse emulsion in produced fluid of an oil production system comprising:
adding a reverse emulsion breaker to the produced fluid of the oil production system in an amount effective for breaking the reverse emulsion,
wherein the reverse emulsion breaker is a polyquaternary ammonium salt;
the polyguaternary ammonium salt being the reaction product of contacting a polyamine intermediate with a difunctional alkylating agent;
the polyamine intermediate being a reaction product of contacting (i) a diamine, a triamine, a tetramine, or a combination thereof with (ii) urea, a dicarboxylic acid, an acid anhydride, a dialkyl ester of a carboxylic acid, or a combination thereof, wherein the difunctional alkylating agent is 1,3-dichloropropan-2-ol, bis(2-chloroethyl)ether, triglycoldichloride, difluoroisobutylether, dibromomethylether, diiododecylpolyether, dichlorononylpolyether, difluorotetrabutyldecylpolyether, epichlorohydrin-functionalized polyethylene glycol, epichlorohydrin-functionalized polypropylene glycol, epichlorohydrin-functionalized poly(ethylene oxide-co-propylene oxide), bisphenol A diglycidyl ether, or a combination thereof.

19. The method of claim 18, wherein the difunctional alkylating agent comprises bis(2-chloroethyl)ether or 1,3-dichloropropan-2-ol.

20. The method of claim 18, wherein the difunctional alkylating agent comprises epichlorohydrin-functionalized polyethylene glycol, epichlorohydrin-functionalized polypropylene glycol, epichlorohydrin-functionalized poly(ethylene oxide-co-propylene oxide), or a combination thereof.

* * * * *

UNITED STATES PATENT AND TRADEMARK OFFICE
CERTIFICATE OF CORRECTION

PATENT NO. : 9,914,882 B2
APPLICATION NO. : 15/058113
DATED : March 13, 2018
INVENTOR(S) : Virgil T. Little and Izabela A. Owsik It is certified that error appears in the above-identified patent and that said Letters Patent is hereby corrected as shown below:

In the Claims

On Column 13, Claim 18, Line 17:
"polyguaternary" should read "polyquaternary"

Signed and Sealed this
Twenty-second Day of May, 2018

Andrei Iancu
*Director of the United States Patent and Trademark Office*